US007369378B2

(12) United States Patent
Sunaga et al.

(10) Patent No.: US 7,369,378 B2
(45) Date of Patent: May 6, 2008

(54) ELECTRIC MOTOR DRIVING APPARATUS

(75) Inventors: Hideki Sunaga, Tokyo (JP); Kaoru Tanaka, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 65 days.

(21) Appl. No.: 11/069,056

(22) Filed: Mar. 2, 2005

(65) Prior Publication Data

US 2005/0231880 A1 Oct. 20, 2005

(30) Foreign Application Priority Data

Mar. 9, 2004 (JP) ............................. 2004-065552

(51) Int. Cl.
*H02H 7/08* (2006.01)
(52) U.S. Cl. ...................... 361/23; 361/91.1; 361/91.7; 361/118
(58) Field of Classification Search ................. 361/23, 361/91.1, 91.7, 118
See application file for complete search history.

(56) References Cited

U.S. PATENT DOCUMENTS 3,579,065 A * 5/1971 Laukaitis ................... 388/813
4,721,870 A * 1/1988 Rector et al. ............... 327/552
5,642,033 A 6/1997 Bartol et al.
5,811,948 A * 9/1998 Sato et al. .................. 318/434
5,815,037 A * 9/1998 Tomasini et al. ............. 330/69
7,119,551 B2 * 10/2006 Burdick ..................... 324/658
2003/0107905 A1 6/2003 Miura et al.

FOREIGN PATENT DOCUMENTS

EP 0 240 172 A2 10/1987
JP 3067601 B2 5/2000

* cited by examiner

*Primary Examiner*—Michael Sherry
*Assistant Examiner*—Lucy Thomas
(74) *Attorney, Agent, or Firm*—Foley & Lardner LLP

(57) ABSTRACT

A surge protective circuit and a noise filter circuit are provided in a power-supplying line, the surge protective circuit is adapted for protecting a switching device from surge voltage generated during operation of an electric motor and the noise filter circuit is adapted for absorbing noise generated during operation of the switching device, each of the surge protective circuit and the noise filter circuit include a plurality of elements, wherein at least one of the plurality of the elements constructing the surge protective circuit is used as at least one of the plurality of the elements constructing the noise filter circuit in common with each other.

14 Claims, 3 Drawing Sheets

ELECTRIC MOTOR DRIVING APPARATUS

BACKGROUND OF THE INVENTION

1. Field of the Invention

The present invention generally relates to an electric motor driving apparatus which carries out switching of a switching device provided in a power distribution line of an electric motor with pulse width modulation (PWM) signals to control a rotational speed or the like of the electric motor. More particularly, the invention relates to an electric motor driving apparatus in which a circuit for suppressing generation of high-frequency noise (radio noise) by the switching is simplified.

2. Description of the Related Art

In an electric motor driving apparatus that drives an electric motor by PWM control, high-frequency noise (radio noise) generated by switching sometimes interferes with and influences, for example, a radio broadcast receiver mounted in a vehicle.

FIG. 3 is a diagram showing a circuit structure of a conventional electric motor driving apparatus. In the conventional electric motor driving apparatus 100, a filter circuit 104 constructed by a series circuit of a capacitor 102 and a resistor 103 is provided between a gate and a drain of a field-effect transistor (FET) 101 as a switching device, and a snubber circuit 108 constructed by a series circuit of a capacitor 106 and a resistor 107 which is in parallel with a flywheel diode 105 are disposed, to suppress the generation of high-frequency noise (radio noise). More specifically, the filter circuit 104 absorbs noise generated during operation of the FET 101 and the snubber circuit 108 protects the FET 101 from surge voltage generated during operation of an electric motor 109, thereby cooperatively suppressing the high-frequency noise (radio noise).

The electric motor 109 drives a radiator fan, a condenser fan or the like for example. Reference numeral 110 denotes a direct-current power supply such as a battery mounted on a vehicle. One of a pair of terminals of the electric motor 109 is connected to a positive pole side of the direct-current power supply 110, whereas the other of the pair of terminals of the electric motor 109 is connected to the drain of the FET 101. The flywheel diode 105 is connected in parallel with the electric motor 109. Reference numeral 111 denotes a PWM signal generator which generates and outputs PWM signals based on command signals. The PWM signals outputted from the PWM signal generator 111 are supplied to the gate of the FET 101.

The FET 101 shown in FIG. 3 is, as one example, an N-channel MOS-FET in which a diode is connected between the drain and a source and a bidirectional zener diode is connected between the gate and the source.

A resistor for detecting current 112 is connected between the source of the FET 101 and an earth terminal (ground). The PWM signal generator 111 monitors an current which flows the FET 101 (current of the electric motor) on the basis of voltage generated at both ends of the current detecting resistor 112 to carry out feedback control of duty ratio of the PWM signals so as to allow the current to be in a predetermined current, or to ensure protection against an overcurrent by stopping the output of the PWM signals when the current exceeds a previously set allowable current.

As another conventional electric motor driving apparatus, Japanese patent registration No. 3067601 discloses an apparatus in which a capacitor is provided between a gate of a switching device (FET) to which PWM signals are inputted and one of a pair of terminals of an electric motor that is disposed at an opposite side of the switching device to suppress the high-frequency noise generated at the time of on/off operation of the switching device by the capacitor.

In the conventional electric motor driving apparatus 100 shown in FIG. 3, since the filter circuit 104 and the snubber 108 as circuits for the suppression of high-frequency noise are independently arranged, respectively, there is a drawback that a total of four components or elements, namely, two capacitors 102, 106 and two resistors 103, 107, are required, rendering the structure of circuit complicated and the number of components to be large.

SUMMARY OF THE INVENTION

Therefore, at least one objective of the present invention is to provide an electric motor driving apparatus capable of constructing a circuit for suppressing high-frequency noise (radio noise) generated by switching with a smaller number of components.

To achieve these and other advantages and in accordance with the purpose of the invention, as embodied and broadly described herein, the invention provides an electric motor driving apparatus. The electric motor driving apparatus comprises a power-supplying line, one end of the power-supplying line is connected to a direct-current power supply; an electric motor connected to the other end of the power-supplying line to receive supply of power via the power-supplying line from the direct-current power supply; a switching device inserted in the power-supplying line; a flywheel diode connected with the electric motor in parallel; a PWM signal generator for outputting PWM signals to the switching device to control operation of the electric motor; the switching device is adapted for receiving the PWM signals and carrying out switching operation according to the PWM signals upon receiving the PWM signals; and a surge protective circuit and a noise filter circuit provided in the power-supplying line, the surge protective circuit is adapted for protecting the switching device from surge voltage generated during operation of the electric motor and the noise filter circuit is adapted for absorbing noise generated during operation of the switching device, each of the surge protective circuit and the noise filter circuit comprise a plurality of elements, wherein at least one of the plurality of the elements constructing the surge protective circuit is used as at least one of the plurality of the elements constructing the noise filter circuit in common with each other.

Following are preferred embodiments (1) to (6) of the electric motor driving apparatus according to the present invention. Any combinations thereof are considered to be preferred ones of the present invention unless any contradictions occur.

(1) The switching device comprises a drain, a source, and a gate for switching an electrical connection between the drain and the source; the electric motor comprises a pair of terminals, one of the pair of terminals is connected with the drain of the switching device and the other of the pair of terminals is connected with a positive pole of the direct-current power supply; the noise filter circuit is constructed by a first capacitor and a resistor, respective one ends of the first capacitor and the resistor are connected mutually with a connection point, the other end of the first capacitor is connected with the gate, and the other end of the resistor is connected with the drain; and the surge protective circuit is constructed by the resistor and a second capacitor connected between the connection point and said the other of the pair of terminals of the electric motor.

(2) The switching device comprises a drain, a source, and a gate for switching an electrical connection between the drain and the source; the electric motor comprises a pair of terminals, one of the pair of terminals is connected with the drain of the switching device and the other of the pair of terminals is connected with a positive pole of the direct-current power supply; the noise filter circuit is constructed by a first resistor and a capacitor, respective one ends of the first resistor and the capacitor are connected mutually with a connection point, the other end of the first resistor is connected with the gate, and the other end of the capacitor is connected with the drain; and the surge protective circuit is constructed by the capacitor and a second resistor connected between the connection point and said the other of the pair of terminals of the electric motor.

(3) The switching device comprises a field-effect transistor, and first and second diodes for protection of the field-effect transistor are connected between the drain and the source, and between the gate and the source, respectively.

(4) The first diode comprises a diode having a cathode connected to the drain and an anode connected to the source for permitting a flow of forward current from the source to the drain, and the second diode comprises a bidirectional zener diode.

(5) The field-effect transistor comprises N-channel MOS-FET.

(6) The electric motor drives a radiator fan or a condenser fan.

According to the electric motor driving apparatus of the present invention, since at least one of a plurality of elements which are respectively constructing the surge protective circuit and the noise filter circuit is used in common with the surge protective circuit and the noise filter circuit, mutually, it is possible to construct a circuit for suppressing the high-frequency noise (radio noise) with a smaller number of components or elements.

According to the electric motor driving apparatus of the present invention, since such a circuit structure is employed in which the resistor is used both as a resistor constructing a conventional filter circuit and a resistor constructing a conventional snubber circuit, it is possible to reduce the number of resistors. In other words, it is possible to reduce the number of components or elements without decreasing the effect of reduction of high-frequency noise.

According to the electric motor driving apparatus of the present invention, since such a circuit structure is employed in which the capacitor is used both as a capacitor constructing a conventional filter circuit and a capacitor constructing a conventional snubber circuit, it is possible to reduce the number of capacitors. In other words, it is possible to reduce the number of components or elements without decreasing the effect of reduction of high-frequency noise.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings.

Figure 1:
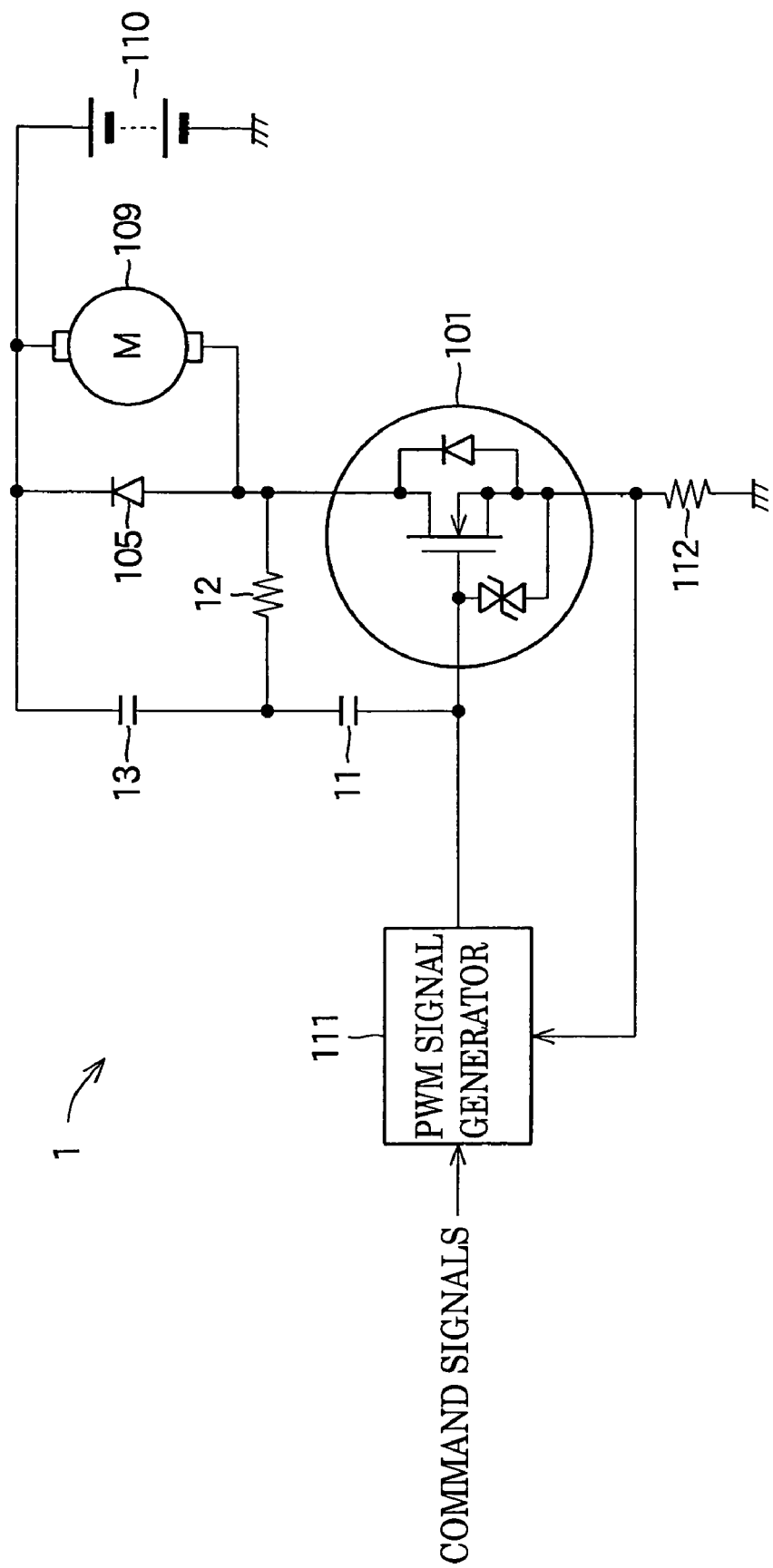
FIG. 1 is a diagram showing a circuit structure of an electric motor driving apparatus according to the present invention.

FIG. 1 is a diagram showing a circuit structure of an electric motor driving apparatus according to the present invention.

Figure 3:
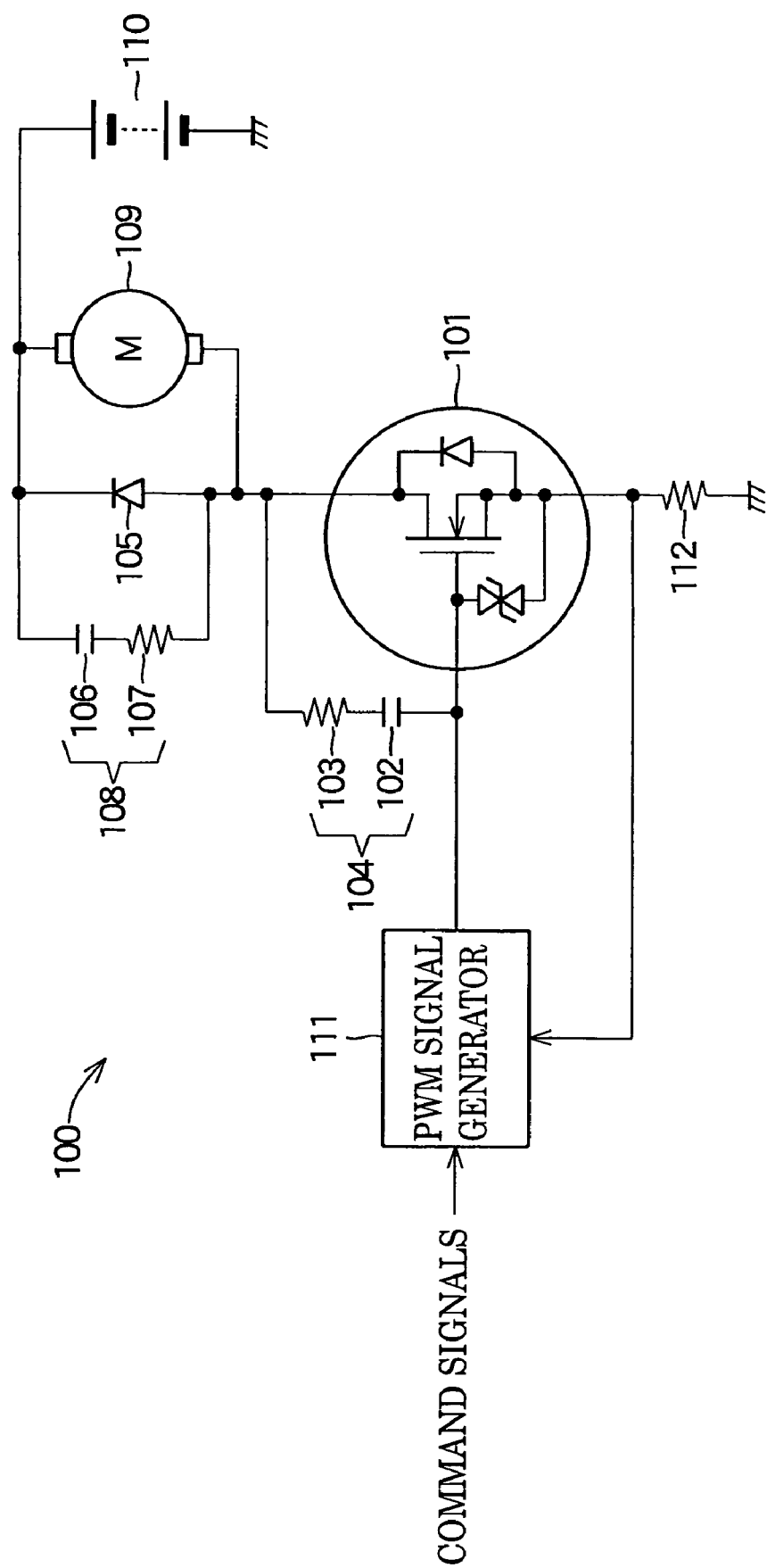
FIG. 3 is a diagram showing a circuit structure of a conventional electric motor driving apparatus.

Wherever possible, reference numerals same as those of the conventional electric motor driving apparatus 100 shown in FIG. 3 are used in the drawings and the description to refer to the same or like parts of the electric motor driving apparatus shown in FIG. 1.

In an electric motor driving apparatus 1 shown in FIG. 1, a series circuit of a first capacitor 11 and a resistor 12 is connected between a gate and a drain of a field-effect transistor (FET) 101 as a switching device, such that the first capacitor 11 is disposed at the gate side and the resistor 12 is disposed at the drain side of the FET 101.

A second capacitor 13 is connected between a connection point of the first capacitor 11 and the resistor 12 and one of a pair of terminals of an electric motor 109 that is opposite of the drain side of the FET 101.

Hence, a CR filter circuit is established by the first capacitor 11 and the resistor 12 between the gate and the drain of the FET 101, and a snubber circuit connected in parallel with the electric motor 109 is established by the resistor 12 and the second capacitor 13.

Therefore, it is possible to suppress high-frequency noise (radio noise) generated by switching of the FET 101 by the CR filter circuit established between the gate and the drain of the FET 101 and the snubber circuit connected in parallel with the electric motor 109. More specifically, the CR filter as a noise filter circuit absorbs noise generated during operation of the FET 101 and the snubber circuit as a surge protective circuit protects the FET 101 from surge voltage generated during operation of the electric motor 109, thereby cooperatively suppressing the high-frequency noise (radio noise).

The electric motor 109 drives, for example, a radiator fan, a condenser fan or the like. Reference numeral 110 denotes a direct-current power supply which is, for example but not limited to, a battery mounted on a vehicle.

Above-mentioned one of the pair of terminals of the electric motor 109 is connected to a positive pole side of the direct-current power supply 110, while the other of the pair of terminals of the electric motor 109 is connected to the drain of the FET 101. A flywheel diode 105 is connected in parallel with the electric motor 109. A PWM signal generator denoted by reference numeral 111 generates and outputs PWM signals based on command signals. The PWM signals outputted from the PWM signal generator 111 are supplied to the gate of the FET 101.

The FET 101 shown in FIG. 1 is, for example but not limited to, an N-channel MOS-FET in which a diode is connected between the drain and a source and a bidirectional zener diode is connected between the gate and the source. In one embodiment, the diode has a cathode connected to the drain and an anode connected to the source for permitting a flow of forward current from the source to the drain.

A current detecting resistor 112 is connected between the source of the FET 101 and an earth terminal (ground). The PWM signal generator 111 monitors an current flowing the FET 101 (current of the electric motor) based on voltage generated at both ends of the current detecting resistor 112 to carry out feedback control of duty ratio of the PWM signals so as to allow the current to be in a predetermined current, or to ensure protection against an overcurrent by stopping the output of the PWM signals when the current exceeds a previously set allowable current.

Figure 2:
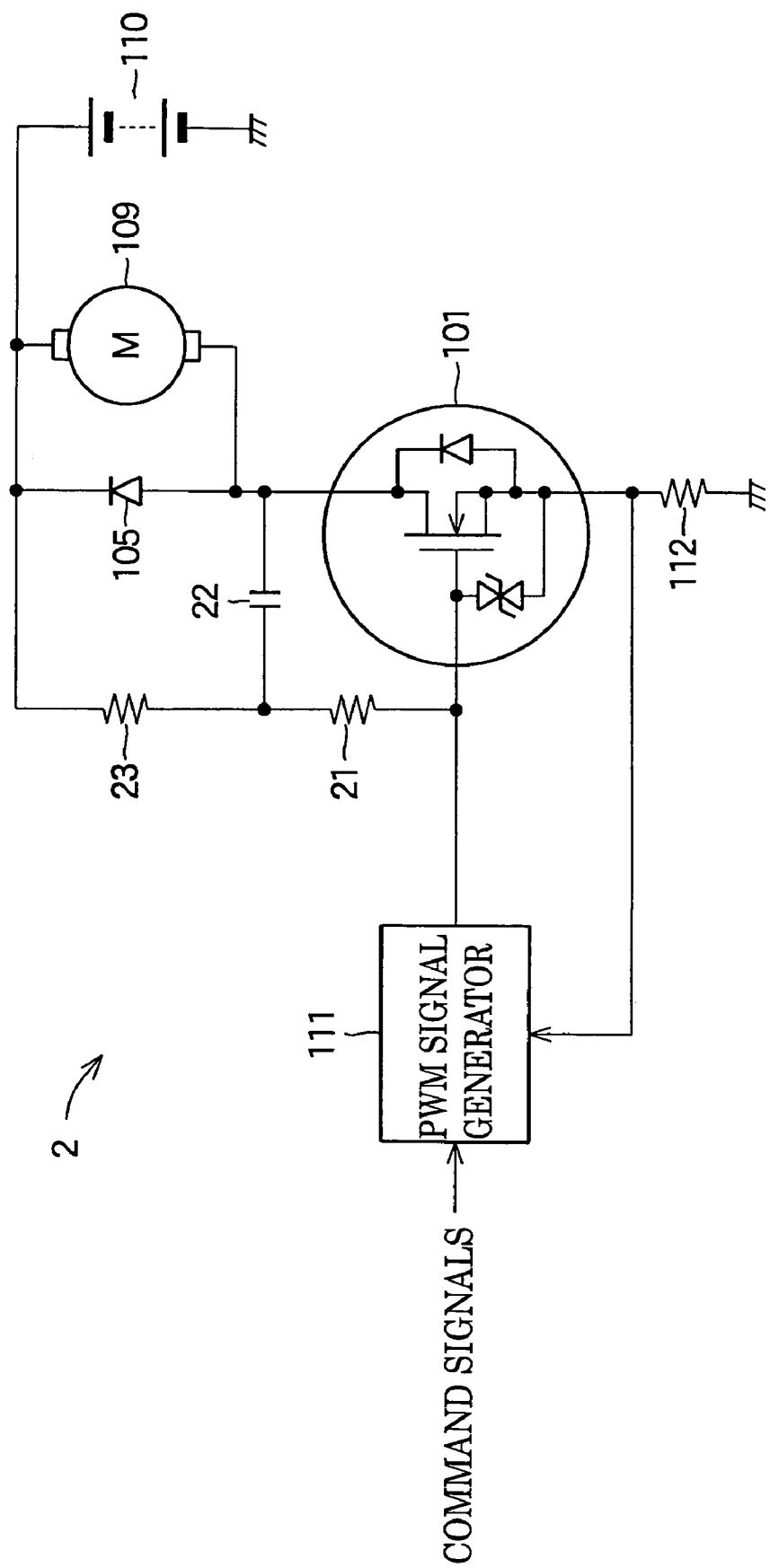
FIG. 2 is a diagram showing a circuit structure of another electric motor driving apparatus according to the present invention.

FIG. 2 is a diagram showing a circuit structure of another electric motor driving apparatus according to the present invention.

Wherever possible, reference numerals same as those of the conventional electric motor driving apparatus 100 shown in FIG. 3 are used to refer to the same or like parts of another electric motor driving apparatus shown in FIG. 2. However, explanations for the same or like parts are omitted here.

In an electric motor driving apparatus 2 shown in FIG. 2, a series circuit of a first resistor 21 and a capacitor 22 is connected between a gate and a drain of a field-effect transistor (FET) 101 as a switching device, such that the first resistor 21 is disposed at the gate side and the capacitor 22 is disposed at the drain side of the FET 101.

Between a connection point of the first resistor 21 and the capacitor 22 and one of a pair of terminals of an electric motor 109 opposite of the drain side of the FET 101, a second resistor 23 is connected.

Accordingly, a CR filter circuit is established by the first resistor 21 and the capacitor 22 between the gate and the drain of the FET 101, and a snubber circuit connected in parallel with the electric motor 109 is established by the capacitor 22 and the second resistor 23.

Therefore, by the CR filter circuit established between the gate and the drain of the FET 101 and the snubber circuit connected in parallel with the electric motor 109, it is possible to suppress the high-frequency noise (radio noise) generated by the switching of the FET 101. More specifically, the CR filter as a noise filter circuit absorbs noise generated during operation of the FET 101 and the snubber circuit as a surge protective circuit protects the FET 101 from surge voltage generated during operation of the electric motor 109, thereby cooperatively suppressing the high-frequency noise (radio noise).

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

This application claims priority from Japanese Patent Application 2004-065552, filed Mar. 9, 2004, which is incorporated herein by reference in its entirety.

What is claimed is:

1. An electric motor driving apparatus, comprising:
a power-supplying line, one end of said power-supplying line to be connected to a direct-current power supply;
an electric motor connected to the other end of said power-supplying line to receive a supply of power via said power-supplying line from said direct-current power supply;
a switching device inserted in said power-supplying line;
a flywheel diode connected with said electric motor in parallel;
a PWM signal generator for outputting PWM signals to said switching device to control operation of said electric motor;
said switching device adapted for receiving said PWM signals and carrying out a switching operation according to the PWM signals upon receiving the PWM signals;
a first circuit including a first capacitor coupled with a common resistor provided in said power-supplying line, thereby establishing a surge protective circuit comprising the first capacitor and the common resistor, being adapted for protecting said switching device from surge voltage generated during operation of said electric motor;
a second circuit including a second capacitor coupled with the common resistor provided in said power-supplying line, thereby establishing a noise filter circuit comprising the second capacitor and the common resistor, being adapted for absorbing noise generated during operation of said switching device; and
a connection point provided in the power-supplying line and connecting one end of the first capacitor and one end of the second capacitor mutually, and connected with one end of the common resistor,
wherein
the switching device comprises a drain, a source, and a gate for switching an electrical connection between the drain and the source of the switching device;
the electric motor comprises first and second terminals, said first terminal is connected with the drain of the switching device and said second terminal is connected with a positive pole of the direct-current power supply;
an other end of the first capacitor opposite of said one end of the first capacitor connected with the connection point is connected to said second terminal of the electric motor;
said one end of the second capacitor and said one end of the common resistor are connected mutually with the connection point, and an other end of the second capacitor opposite of said one end of the second capacitor is connected with the gate of the switching device; and
an other end of the common resistor opposite of said one end of the common resistor connected with the connection point is connected with the drain of the switching device.

2. The electric motor driving apparatus according to claim 1, wherein the switching device further comprises a field-effect transistor, a first diode connecting the drain and the source of the switching device and adapted for protecting the field-effect transistor, and a second diode connecting the gate and the source of the switching device and adapted for protecting the field-effect transistor.

3. The electric motor driving apparatus according to claim 2, wherein the first diode further comprises a diode having a cathode connected to the drain of the switching device and an anode connected to the source of the switching device for permitting a flow of forward current from the source to the drain of the switching device.

4. The electric motor driving apparatus according to claim 2, wherein the second diode includes a bidirectional zener diode.

5. The electric motor driving apparatus according to claim 2, wherein the field-effect transistor includes an N-channel MOS-FET.

6. The electric motor driving apparatus according to claim 1, wherein the electric motor is connected with a radiator fan to drive the radiator fan.

7. The electric motor driving apparatus according to claim 1, wherein the electric motor is connected with a condenser fan to drive the condenser fan.

8. An electric motor driving apparatus, comprising:
a power-supplying line, one end of said power-supplying line to be connected to a direct-current power supply;
an electric motor connected to the other end of said power-supplying line to receive a supply of power via said power-supplying line from said direct-current power supply;
a switching device inserted in said power-supplying line;
a flywheel diode connected with said electric motor in parallel;
a PWM signal generator for outputting PWM signals to said switching device to control operation of said electric motor;
said switching device adapted for receiving said PWM signals and carrying out a switching operation according to the PWM signals upon receiving the PWM signals;
a first circuit including a first resistor coupled with a common capacitor provided in a said power-supplying line, thereby establishing a surge protective circuit comprising the first resistor and the common capacitor, being adapted for protecting said switching device from surge voltage generated during operation of said electric motor;
a second circuit including a second resistor coupled with the common capacitor provided in said power-supplying line, thereby establishing a noise filter circuit comprising the second resistor and the common capacitor, being adapted for absorbing noise generated during operation of said switching device; and
a connection point provided in the power-supplying line and connecting one end of the first resistor and one end of the second resistor mutually, and connected with one end of the common capacitors,
wherein:
the switching device comprises a drain, a source, and a gate for switching an electrical connection between the drain and the source of the switching device;
the electric motor comprises first and second terminals, said first terminal is connected with the drain of the switching device and said second terminal is connected with a positive pole of the direct-current power supply;
an other end of the first resistor opposite of said one end of the first resistor connected with the connection point is connected to said second terminal of the electric motor;
said one end of the second resistor and said one end of the common capacitor are connected mutually with the connection point and an other end of the second resistor opposite of said one end of the second resistor is connected with the gate of the switching device; and
an other end of the common capacitor opposite of said one end of the common capacitor connected with the connection point is connected with the drain of the switching device.

9. The electric motor driving apparatus according to claim 8, wherein the switching device further comprises a field-effect transistor, a first diode connecting the drain and the source of the switching device and adapted for protecting the field-effect transistor, and a second diode connecting the gate and the source of the switching device and adapted for protecting the field-effect transistor.

10. The electric motor driving apparatus according to claim 9, wherein the first diode further comprises a diode having a cathode connected to the drain of the switching device and an anode connected to the source of the switching device for permitting a flow of forward current from the source to the drain of the switching device.

11. The electric motor driving apparatus according to claim 9, wherein the second diode includes a bidirectional zener diode.

12. The electric motor driving apparatus according to claim 9, wherein the field-effect transistor includes an N-channel MOS-FET.

13. The electric motor driving apparatus according to claim 8, wherein the electric motor is connected with a radiator fan to drive the radiator fan.

14. The electric motor driving apparatus according to claim 8, wherein the electric motor is connected with a condenser fan to drive the condenser fan.

* * * * *